Jan. 22, 1946.　　　T. MULLARKEY　　　2,393,397
FORMER FOR ARMATURE COILS
Filed April 13, 1944　　　5 Sheets-Sheet 1

Inventor
Thomas Mullarkey
by Joshua R. H. Potts
His Attorney.

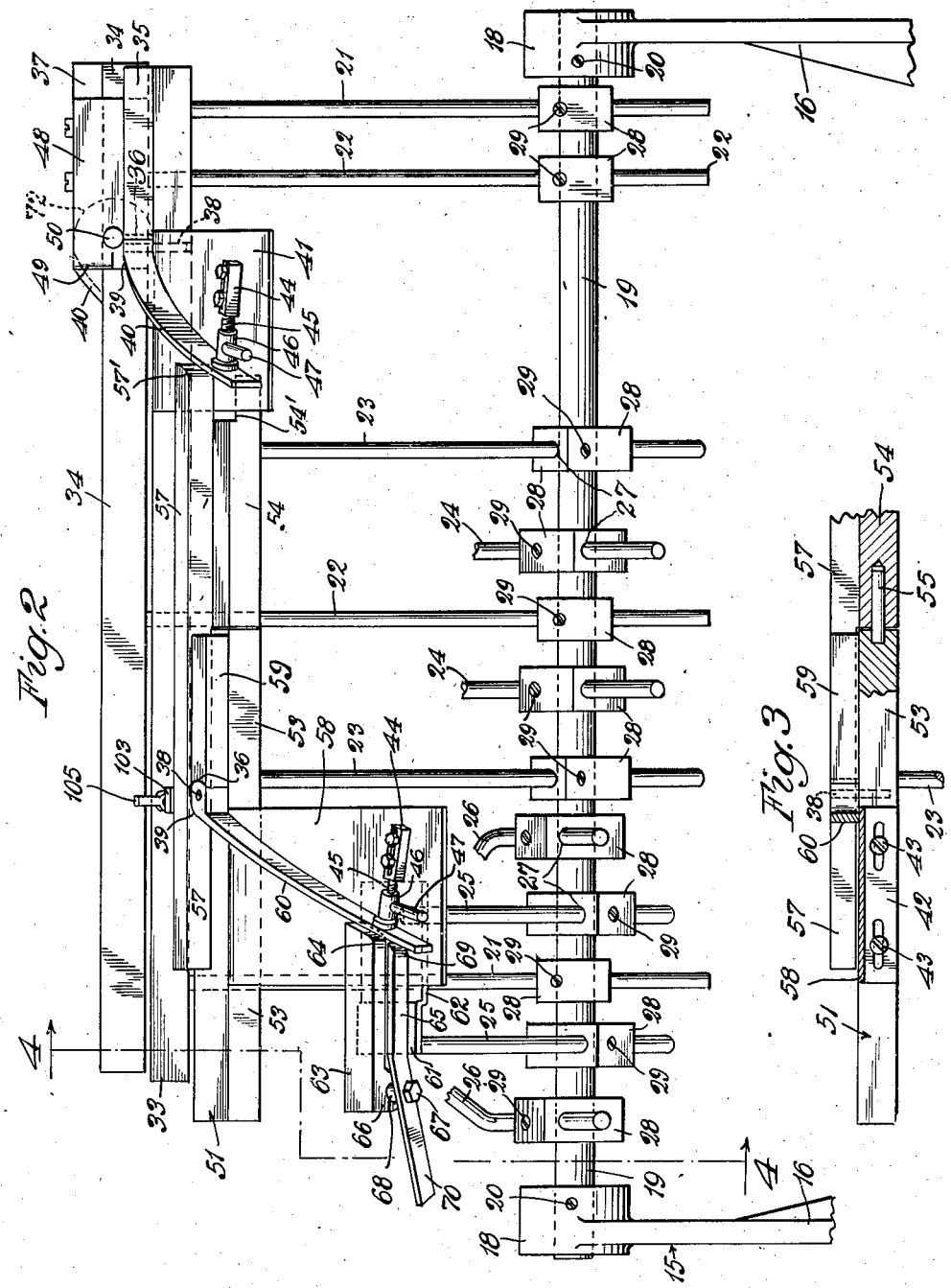

Jan. 22, 1946.   T. MULLARKEY   2,393,397
FORMER FOR ARMATURE COILS
Filed April 13, 1944   5 Sheets-Sheet 3
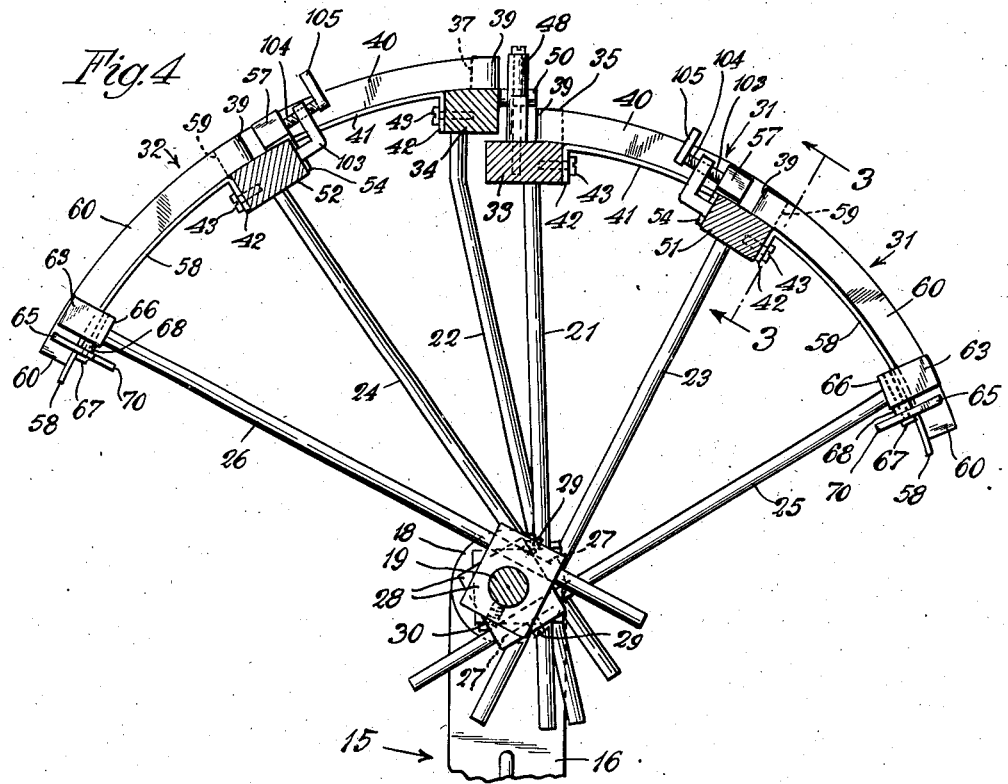
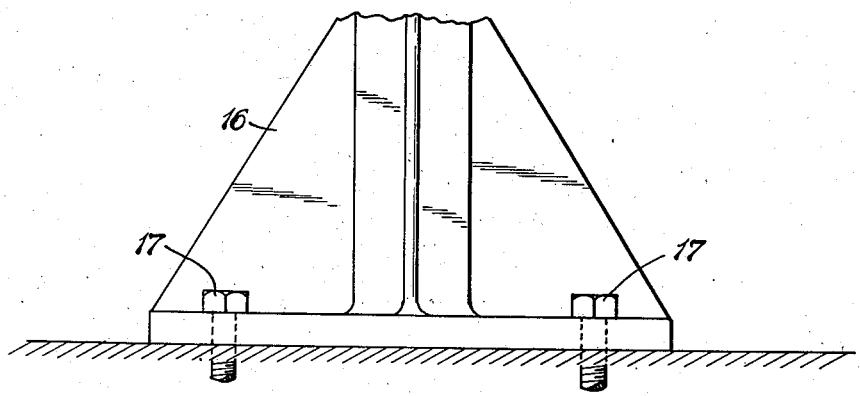
Inventor
Thomas Mullarkey
by Joshua R. H. Potts
His Attorney.

Jan. 22, 1946. T. MULLARKEY 2,393,397
FORMER FOR ARMATURE COILS
Filed April 13, 1944 5 Sheets—Sheet 4

Inventor
Thomas Mullarkey
by Joshua R. H. Potts
His Attorney.

Jan. 22, 1946.   T. MULLARKEY   2,393,397
FORMER FOR ARMATURE COILS
Filed April 13, 1944   5 Sheets-Sheet 5
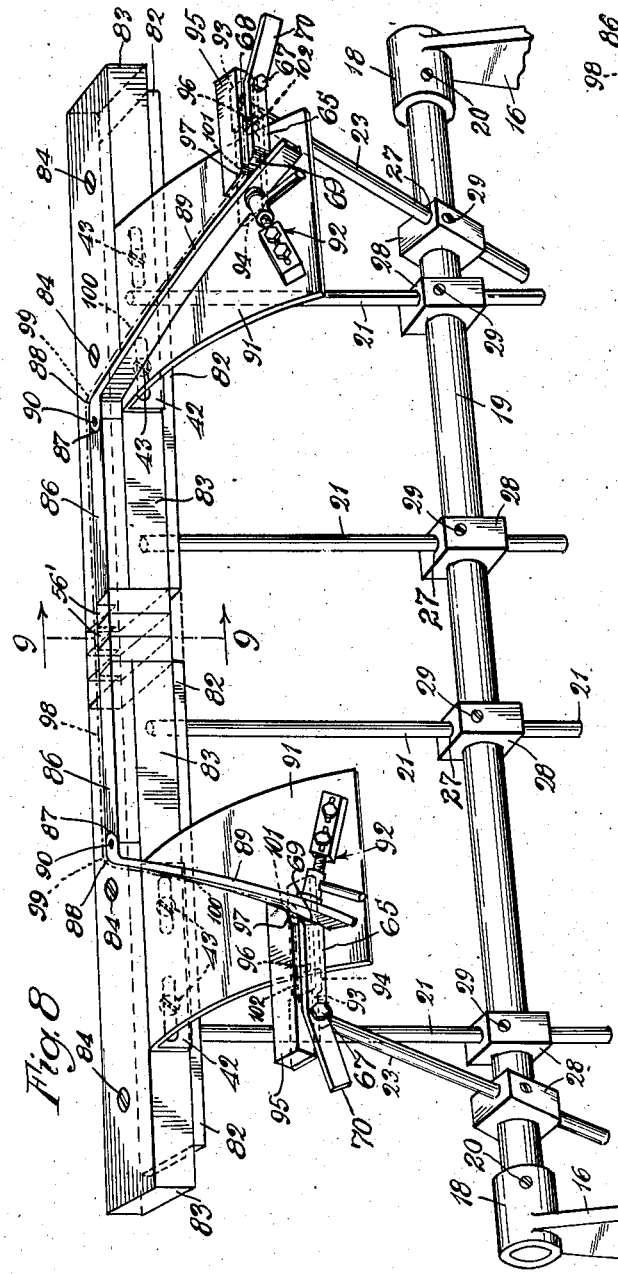
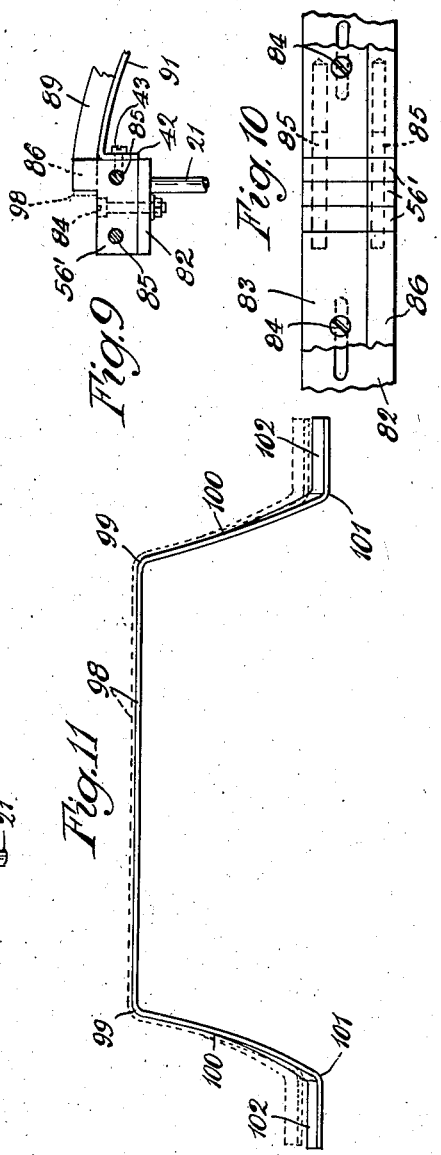
Inventor
Thomas Mullarkey
by Joshua R. H. Potts
His Attorney.

Patented Jan. 22, 1946

2,393,397

UNITED STATES PATENT OFFICE 2,393,397

FORMER FOR ARMATURE COILS

Thomas Mullarkey, Chicago, Ill.

Application April 13, 1944, Serial No. 530,804

11 Claims. (Cl. 140—92.1)

My invention relates to a former for armature coils, especially those having a bell nose or open loop with offset portions branching therefrom and made of flat strips or wire to fit the slots of medium and large size motors and generators, as distinguished from small motors using small wire and which are usually made on machines, and for other types of coils.

In making armature coils for medium and large size motors and generators, and renewals, repairs or reconstruction thereof, since there are thousands of differently dimensioned coils of standard shapes, and they are made of flat wire, or strips of copper which are bent and hammered into shape on the forms, these coils are made by hand and in accordance with the present practice, on an iron form to give them their exact shape and each form may only be used to make coils of about three sizes of the same shape, and since these forms are made of cast iron, they are extremely expensive, heavy and cumbersome to handle, weighing 160 pounds or more.

This, also, requires many different forms for different coil sizes and proportions, even for repair jobs, and the storage space required for such forms, and their classification and filing, together with the many parts used in connection therewith, are, also, serious problems in expense and handling, and usually do not fit, and cannot be used for the job at hand.

It is, therefore, an object of the present invention to provide an adjustable form made up of adjustable and interchangeable parts which can be set up in various sizes and proportions for producing coils for a large number of motors and generators within certain ranges, thereby reducing the number of forms required, and the expense incident thereto.

This, also, reduces, or eliminates the necessity of maintaining warehouses, or large storage spaces, to store forms as now required by factories, and the necessity of repair shops making a new form for practically every set of coils to be made, in view of the fact that the motors and generators which they are required to repair, are almost all different from each other.

By making a comparatively simple form having adjustable and interchangeable parts which can be accurately set to the size and proportion required, the difficulties referred to are overcome, since but few devices would be required and could be used for forming coils of standard shapes within a wide range of sizes and proportions, especially for one turn and half turn coils.

Another object is to provide a former for metal wire or strap coils for winding armatures of the open slot type, for motors and generators, or dynamo electric machines of the commutator type, to provide for variation in size and proportions, as well as form, and so that a plurality of substantially identical coacting, or interfitting coils may be constructed together, or at one time whereby they will properly fit the slots of the armatures.

Another object is to provide a former for armature coils which may be mounted on a frame, and is easily accessible for adjustment according to the sizes and proportions of the coils to be made, and which will greatly facilitate the making of the coils.

Further objects and advantages will appear and be brought out more fully in the following specification, reference being had to the accompanying drawings in which—

Fig. 2 is a side elevation with parts broken away.

Fig. 3 is a fragmentary sectional elevation, taken on the line 3—3 of Fig. 4.

Fig. 4 is a section on the line 4—4 of Fig. 2.

Figure 5:
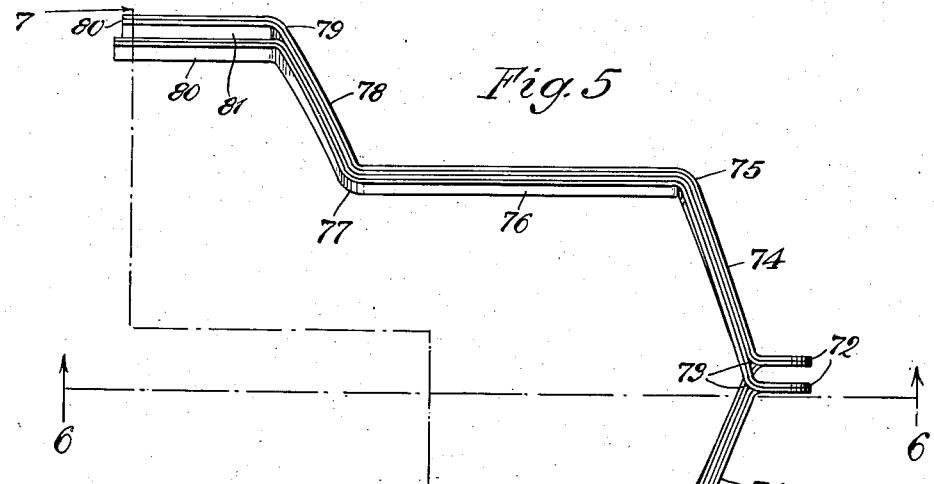
Fig. 5 is a plan view of one type of coil.
Figure 6:
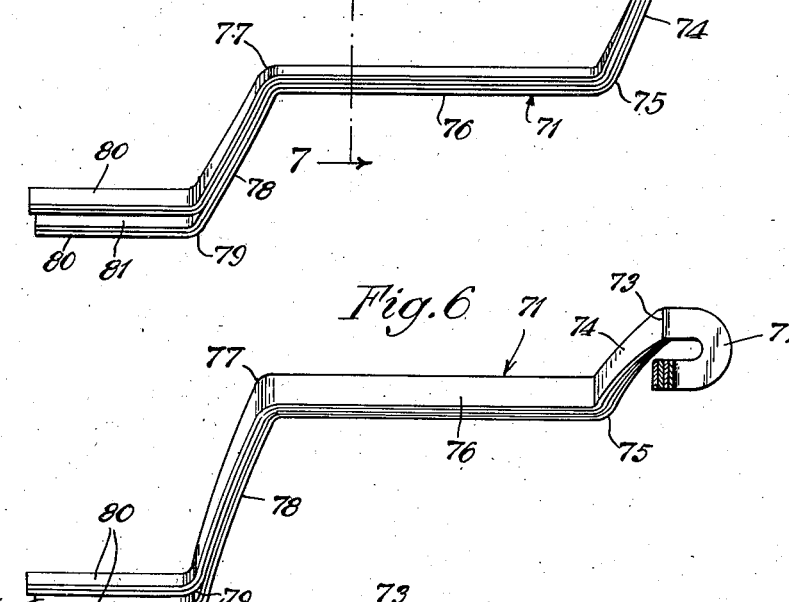
Figure 7:
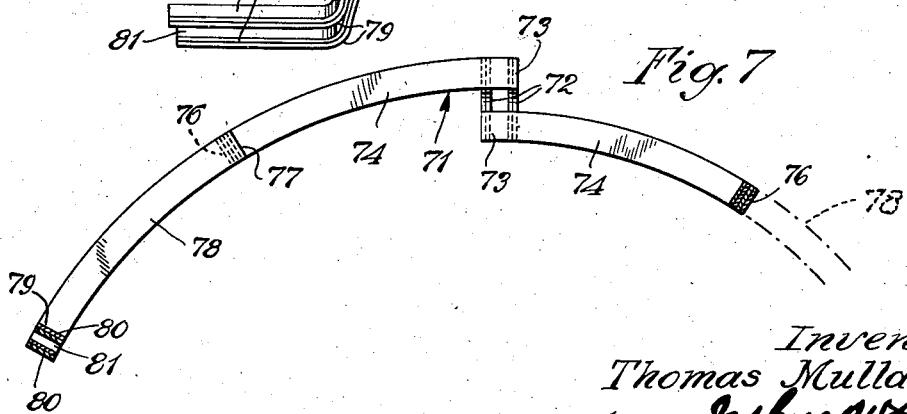

Figs. 6 and 7 are sections taken on the lines 6—6 and 7—7 of Fig. 5.

Fig. 8 is a perspective view of a modified former for producing the type of coil shown in Fig. 11.

Fig. 9 is a fragmentary section taken on the line 9—9 of Fig. 8.

Fig. 10 is a fragmentary plan view of the part shown in Fig. 9, and

Fig. 11 is a plan view of another type of coil.

The device is shown as comprising a stationary or portable supporting frame 15, having upright end members 16, which may be anchored as at 17 and provided with sleeves or bearings 18 in which the ends of a horizontal supporting member in the form of a rod or shaft 19 is held fixed, as by set screws 20.

Mounted on the supporting rod 19 are a plurality of sets of radial arms or rods 21, 22, 23, 24, 25, and 26, the inner ends of which extend through and are radially adjustable in holes or sockets 27 in bearing collars or blocks 28, and held by set screws 29, so that the radial curvature may be varied. The collars are adjustably held, as by set screws 30 engaging the rod or shaft 19, and can be adjusted circumferentially and longitudinally thereon to vary the positions of the arms relatively or individually, and the spacing or radial positions of the arms 21 to 26, inclusive.

The former is, generally speaking, made up of two circumferential sections 31 and 32, one projected or offset radially beyond the other on substantially concentric arcs to provide a raised portion or shoulder at either side, or facing in either direction according to the coils to be produced, and with the supporting rod 19 as an axis.

For this purpose, a longitudinal forming bar 33, preferably of rectangular cross-section, is supported on the outer ends of the arms 21, and a like bar 34 is similarly supported on the outer ends of the rods 22 radially outwardly, or offset, from the bar 33, in suitable spaced relation, but so as to partially overlie the bar 33, which is thereby offset radially inwardly and laterally from the bar 34, but parallel thereto circumferentially and radially.

By this means, the bars 33 and 34, and thus their supporting arms 21 and 22, are located on opposite sides of a line or point substantially at the transverse center of the device. At one end, the bar 33 has a longitudinal riser 35 in the form of a shoulder or raised portion adjacent its outer edge, with a recessed concave end 36 and a similar rise 37, parallel to and spaced from the riser 35, is provided at the inner edge of the bar 34, with a similar recessed concaved end, each of which bears a pivot screw or pin 38, to pivotally mount and support the enlarged rounded end 39 in alignment with the risers 35 and 37 to form convex bending surfaces or noses formed on the ends of arcuate resilient forming arms 40, extending in obtuse-angled relation thereto, of a desired radius or circumferential curvature concentric to the axis 19, in accordance with the coil to be produced, and bent edgewise thereon.

These arms 40 branch outwardly in divergent and obtuse-angled relation to the rounded end portions 39, which are pivoted on the bars, and relative to each other, and the risers 35 and 37, and extend over curved plates 41 of sheet metal and of similar radius to correspond with the inner edges of the arms 40, so as to additionally support the latter, especially at their free or outer ends, although engaged therewith and conforming thereto throughout their lengths.

Plates 41 have slotted flanges 42 removably and adjustably secured to the outer faces of the bars 33 and 34, as at 43, for longitudinal adjustment thereon, and with the arms 40 extending diagonally oppositely across the plates for engagement at their outer portions by adjustable clamps or binding means shown as comprising lengthwise adjustable bodies 44, mounted on the plates 41 and having projecting threaded shanks 45 on which heads 46 are swiveled and have threaded engagement therewith by corresponding threaded sockets.

The bodies 44 constitute anchoring means and are adjustably bolted to the plates by means of slots, while the threaded sockets of the heads 46 are engaged and adapted to translate on the shanks 45 by turning handles 47 on the heads to move toward and away from the outer faces at the free ends of the arms 40 to clamp and release the branching portions of the coils held thereby, as will be later set forth.

Between the risers 35 and 37 on the bars 33 and 34, to extend radially outwardly as far as the riser 37, a spacer 48 is mounted for longitudinal adjustment, as by bolts and slots, and this spacer is in the form of a bar having oppositely curved rounded nose portions 49 at its inner end, positioned one above the other in alignment with and conforming to the direction in which the arms 40 extend therefrom.

Spaces are provided between the opposite sides of the spacing bar 48 and the risers 35 and 37, and oppositely projecting lugs or ends of a crosspin 50 extends from opposite sides of the spacer 48 to receive and anchor the bell nose of a coil which is in the form of a loop, so that several flat wires may be mounted thereon at one time.

Rods 23 and 24 support intermediate parallel longitudinal bars 51 and 52, each made of two longitudinally adjustable sections 53 and 54, movable toward and away from each other, with the rods 23 and 24 supporting them, and held in alignment by dowel pins, or the like, 55 carried by one section and movable in bores in the other section, so as to maintain them rigid.

Figure 1:
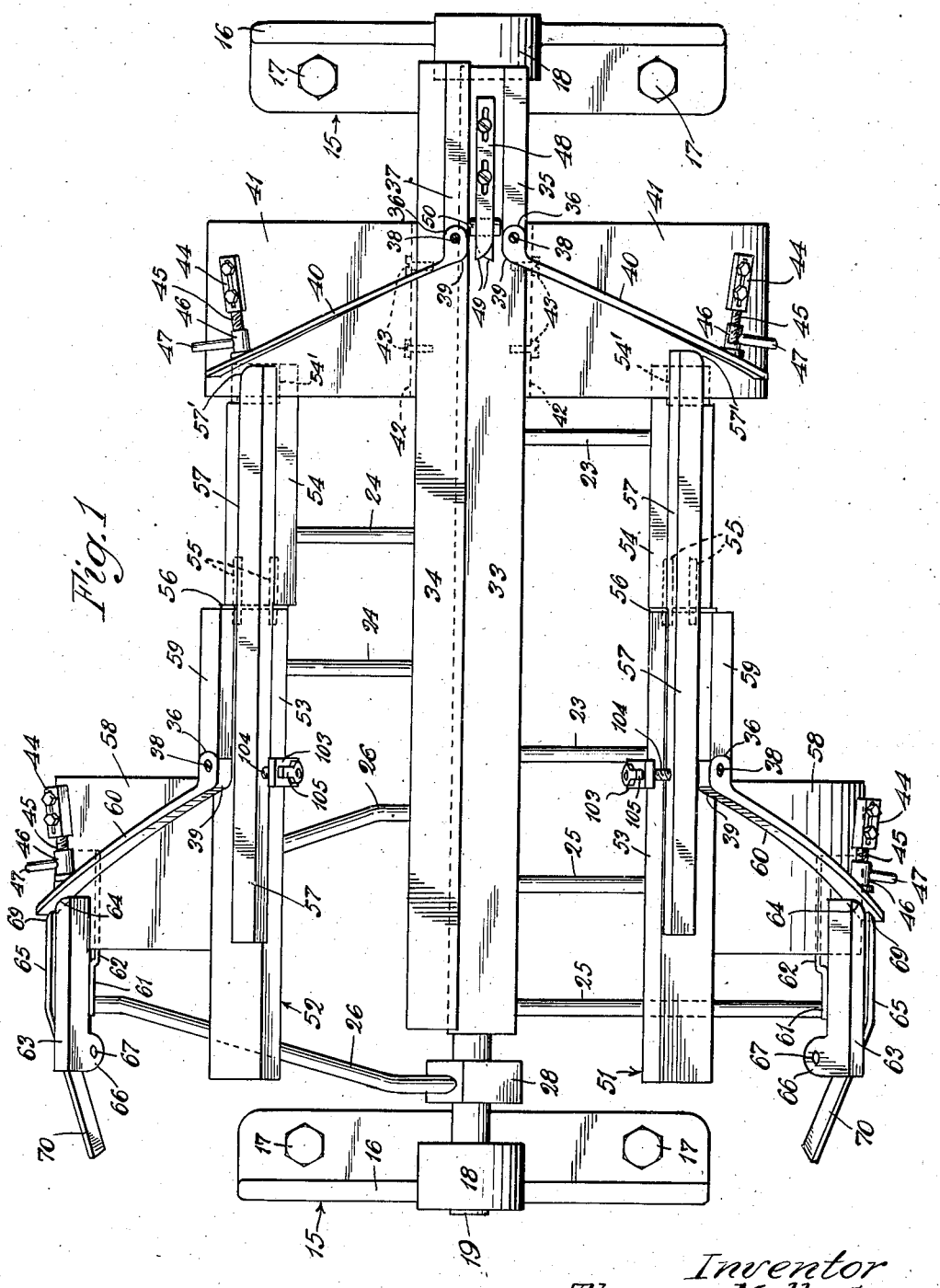
Fig. 1 is a top plan view of a former for producing the type of coil shown in Figs. 5, 6, and 7.

This, also, permits separation of the sections, and the insertion of one or more gauge blocks 56 of predetermined thicknesses therebetween, as shown in Figs. 1 and 8 of the drawings, depending upon the length of the portions of the coils which are being formed, and which fit against the bars 51 and 52, and longitudinal risers formed or mounted thereon.

As shown, longitudinal risers 57 are formed on, or project upwardly from sections 53 and 54 adjacent their inner edges. The ends of the risers over the sections 54 project over the plates 41, and the sections 54 are recessed at the top to provide slots 54' which cooperate with the projecting portions of the risers to receive the adjacent edges of the plates, and support the same in conjunction with their mountings on the bars 33 and 34.

The ends of the risers adjacent the arms 40 are, also, provided with rounded noses 57' to determine the angle bend of the coils at these points. Plates 58, similar to plates 41, are supported on the bars 51 and 52 near their opposite ends in the same manner that the plates 41 are secured to the bars 33 and 34, but longitudinally spaced therefrom and located laterally and circumferentially outwardly thereof. Risers 59 are provided on the bars 51 and 52 at the sections 53 thereof, and are formed similar to the risers 35 and 37, with concaved ends 36 pivotally receiving and supporting rounded enlargements similar to part 39 on pins similar to the pins 38 for pivotally supporting resilient arcuate forming levers, or arms 60, which, also, branch outwardly in divergent relation to each other. The radius of these arms corresponds to the radius desired, depending upon the size of the coil, and is similar to that of the plates 58.

Adjustable clamps or binding means similar to those on the plates 41 are, also, adjustably mounted on the plates 58 to similarly coact with the free ends of the arms 60 to bind and clamp the flat wire bent edgewise against the arms 60 on the plates 58, around the rounded noses at the inner angular portions of the arms 60, which are pivoted to the risers 59.

Arms 25 and 26 support holding jaws comprising plates 61 offset, as at 62, to extend beneath and support the outer portions of the plates 58, and also, support bending bars 63, the inner ends of which, above the offset portions of the plates 61, extend above the plates 58 to hold the latter therebetween, and are formed with rounded bending noses or corners 64 coacting with the arms 60, to determine the angle in which the flat wire strips are bent with a slight curvature in each instance, and serving to tightly clamp and hold said strips at such points while being bent and hammered into shape.

The conductor ends of the coils are bent or hammered against the outer edges or faces of the blocks or bars 63, and extend parallel to each other and the intermediate portions which are formed on the bars 51 and 52 against the risers 57. Obtuse-angled levers 65 are pivotally supported horizontally on the outer ends of the blocks or bars 63, to apertured lugs 66, as indicated at 67. These lugs depend from the outer ends of the bars 63, and the levers are disposed in spaced relation to the bars 63, as by means of spacing sleeves 68.

The inner portions of the levers 65 align with the bars 63 at their outer sides, but are spaced therefrom and rounded at their inner ends, as at 69, to conform to the rounded corners or noses at the inner ends of the bars 63, as indicated at 64, so that the conductor ends of the next outer strip of a coil will be properly bent, and when so bent, thereagainst, will lie in spaced relation to the conductor ends bent against the blocks or bars 63 to provide clearance spaces between said conductor ends.

When this is done, the levers 65 are swung in alignment with the bars 63, or into positions against the conductor ends bent thereagainst so that the next conductor end will be bent against the outer face of the lever. The outer ends of the levers 65 form handles 70 and permit the ends of the coils, that is, the conductor ends of the strips or flat wire from which the same are formed, to pass over the pivots 67 without obstruction and said ends may be cut off to the proper lengths.

The device just described and shown in Figs. 1 to 4, inclusive, is for forming coils of the type shown, and shaped as indicated in Figs. 5, 6 and 7 of the drawings, of flat copper wire or conductor strips which are first bent edgewise intermediately of their lengths on a pin or other suitable means, as is common in the art, to form vertical bell noses or loops 72.

As shown, two strips are laid together in each pair, spaced apart to fit in the slots or spaces between the risers 35 and 37 and the opposite sides of the adjustable spacer or bar 48, with the loops engaging on the ends of the pin or lugs 50, so as to rest on the bar 33 to fit against the top portion of the raised radial portion, or shoulder, at bar 34, at one side of the loop 72, so that the sides of the coil strips at one side extend over the plate 41 and may be bent, as at 73, or hammered around the rounded inner ends 49 of the spacer 48, and curved to correspond with the radius of the arms 40 and plates 41 at both sides, and then extend outwardly at obtuse angles along said arms 40.

The lower portion of the strip from the loop 72 is bent outwardly first and then the upper portion, until all of the strips are bent to conform to one another, and hammered into shape with a suitable tool, to accurately conform to the slots in which they are adapted to fit. The upper portions are bent out in similar manner along the arms, and against the same in divergent relation to the strip portions at the other side which extend over the other plate, and in divergent relation to each other alternately in opposite directions, as at 74.

The strips are then curved to fit the arms 40 and plates 41 at the curved radius portions 74, and are bent edgewise at such points. The strips or flat wires are then bent at 75 inwardly and formed or hammered around the noses 57', along the risers 57 at their outer faces on the bars 51 and 52 within and against the inner faces of the risers 59 to form the parallel coil portions 76, which fit in the transverse slots of the armatures. These strips or flat wires of the coils are then bent outwardly at obtuse angles around the rounded inner ends of the arcuate radius arms 60 and against the same at their inner faces, and on the plates 58 in conformance with the curvature thereof, as at 77, to form the curved divergent radius portions 78.

The strips are then clamped against the noses 64 or 69, and bent around the same, as at 79, parallel to the portions 76, to form the conductor ends which are bent against the outer faces of the bars 63 or forming levers 65, to form the spaced conductor ends 80 with the clearance space 81, between the pairs of wires or strips at such points.

In the form of the device shown in Figs. 8, 9 and 10 of the drawings, the arms, such as 21 and 23, support an elongated strip or plate 82, and to this plate supporting bars 83 are adjustably secured, as indicated at 84, with suitable slots and bolts for making the connection, or otherwise, for longitudinal adjustment to vary the length of the plate and bar, and to permit them to be separated at their inner ends any desired degree, or to be moved together. Thus, the bars 83 may abut at their inner ends or be adjusted in spaced relation to receive gauge blocks 56' of predetermined thicknesses, corresponding to the gauge blocks 56 heretofore described.

This adjustment may be effected on dowel pins 85, to keep the sections in alignment, the pins being fixed in the end of one section, and movable in bores in the other section, the same as described in connection with the dowel pins 55.

Risers 86 are provided on the bars 83 at their inner portions and edges thereof between which the gauge blocks also extend and with which they conform. The outer ends of the risers 86 are recessed vertically, as at 87, to provide concave ends for receiving the rounded and enlarged angular inner ends 88 of arms 89, which are pivoted thereto, as at 90, in the same manner that the arms 40 and 60 are pivoted to the risers 35, 37 and 59.

These radius arms 89 are curved edgewise to correspond to the exact curvature of the radius portions of the coils which are formed thereagainst, and upon sheet metal plates 91, disposed against the bottom edges thereof. The plates 91 are secured to the sides or longitudinal edges of the bars 83 for longitudinal adjustment toward and away from each other, and in alignment, in the same manner that the plates 41 and 58 are mounted on the bars 33, 34, 51 and 52, respectively, and therefore, corresponding reference characters have been applied to corresponding parts which are the same, as described in connection with the other form of the invention in various respects.

The plates 91 are provided with clamping or binding means 92, corresponding to the clamps mounted on the plates 41 and 58. However, these plates 91 are in alignment longitudinally instead of being offset relative to each other, as are the plates 41 and 58. The clamps 92 force the arms 89 against the strips and bending means now to be described. Certain of the arms or rods 25 support jaws including plates 93, with offset portions 94, similar to plates 61, and offset portions 62, and these offset portions extend longitudinally under the plates 91 to support the latter. Bars or blocks 95 are mounted upon the plates 93, and arms 25, in alignment with the plate 93, but terminating short of the inner ends thereof to provide slots 96 for receiving the plates 91 therein, so that the bars 95 extend over the plates 91, and have rounded inner ends at their corners or noses 97, similar to portions 64, so that the portions of the coil may be bent outwardly around the same and parallel to the intermediate portions after forming the radius portions on the plates 91 against the arms 89.

This device is for forming the type or shape of coil shown in Fig. 11 of the drawings, with a straight intermediate portion 98, curved at 99, around the noses 88 of the levers 89 to form the arcuate divergent radius portions 100, which are curved edgewise concentric to the axis formed by the rod or shaft 19 in obtuse-angled relation to the portion 98 and then bent around the noses 97, as indicated at 101, to form the conductor ends 102, which are in alignment and parallel to the portions 98.

The coils may be formed single or multiple ply, that is, with one or more flat wires or strips of copper bent and formed at the same time, or independently, so as to be in contact and conform to one another. Usually, only two strips can be bent at one time, but it is optional as to whether they are bent individually or simultaneously.

Corresponding means may be provided on the bars or blocks 95 to space the ends of the conductors 102, to provide clearance spaces therebetween, such as by means of the levers 65, shown and described in the other form of the invention.

Suitable clamping means may be provided to hold the coil strips against the offsets, shoulders or risers, such as 57 and 86, and shown as right-angular brackets or bearing arms 103 carried by the supports 51 or bars 52, 53 or 83, and offset or spaced therefrom and risers 57, etc.

These brackets or arms 103 have threaded apertures or bores receiving threaded shanks or screws 104 which are turned against the coil strips disposed along the shoulders or risers by means of handles 105, to clamp the strips thereagainst to insure proper holding thereof in position and correct shaping or forming thereof. When the coils are completed, the screws 104 are turned in the reverse directions or backed off to release the clamps or screws 104 and release the coils or strips so formed.

By means of the present device, the coils may not only be quickly produced, to facilitate construction and repair jobs, but the device may be adjusted to various sizes within certain ranges for making coils of a number of different sizes, so as to obviate the necessity of employing expensive, heavy and cumbersome molds, which are only good for a coil of one size, although sometimes used for two or three sizes, within accurate results, in view of the fact that the lengths of the different parts and their proportions and relations to each other vary in each size of coil, and most all of the coils of the various motors submitted for reconstructions or repair are all different. Therefore, the forming or making of the coils of various sizes and proportions will be greatly facilitated.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. In a former for armature coils, a frame, adjustable supports on the frame and forming devices mounted on the supports, said forming devices including a horizontal member having a raised portion forming a shoulder and supporting surfaces carried by the supports and member, angle members carried by the member at opposite portions of the shoulder, and clamping means cooperating with said angle members.

2. In a former for flat wire armature coils, a frame having an axial shaft, radially adjustable supports carried by the axial shaft, bars on the supports and having a raised portion parallel to the axial shaft, plates on the bars, and radius members extending from the bars and over the plates.

3. In a former for flat wire armature coils, a frame having an axial shaft, radially adjustable supports carried by the axial shaft, bars on the supports and having a raised portion parallel to the axial shaft, plates on the bars, said plates being curved concentric to the axial shaft, radius members having angular portions at the bars for bending a strip laid against the raised portion, and conforming to the plates, and bending means adjacent the plates.

4. In a former for flat wire armature coils, a frame having an axial shaft, radially adjustable supports carried by the axial shaft, bars on the supports and having a raised portion parallel to the axial shaft, plates on the bars, said plates being curved concentric to the axial shaft, radius members having angular portions at the bars for bending a strip laid against the raised portion, and conforming to the plates, certain of said supports engaging the plates and having curved portions, and clamping means coacting with the radius members to hold the strips between the members and curved portions.

5. In a former for flat wire armature coils, a frame, a horizontal shaft carried by the frame, radial members radially and circumferentially adjustable on the shaft, bars carried at the outer ends of the members and forming a radial raised portion for mounting a flat wire thereagainst, plates adjustably secured to the bars and concentric to the shaft, arms pivoted adjacent the bars and having rounded angular portions for bending the wire thereon, and jaws cooperating with the arms to receive the wire therebetween and bending the wire around the jaws.

6. In a former for flat wire armature coils, a frame, a horizontal shaft carried by the frame, radial members radially and circumferentially adjustable on the shaft, bars carried at the outer ends of the members and forming a radial raised portion for mounting a flat wire thereagainst, plates adjustably secured to the bars and concentric to the shaft, arms pivoted adjacent the bars and having rounded angular portions for bending the wire thereon, said arms being flexible and curved similarly to the plates, supporting means for the plates, including jaws coacting with the arms, and means to flex the arms toward the jaws to clamp the wire therebetween.

7. In a former for armature coils of flat wire strips, a horizontal rod, radial members adjustable on the rod radially, rotationally and longitudinally thereof, coacting longitudinal bars on the members, and having a radial shoulder, resilient arms pivoted on the bars, raised portions adjacent the pivoted ends of the arms and disposed in angular relation relative thereto, said arms being curved circumferentially relative to the rod, bearing surfaces carried by the bars beneath and conforming to the curvature of the arms, and other bars supported by the members and having end portions adjacent the arms, and having means to engage and support the bearing surfaces.

8. In a former for armature coils of flat wire strips, a horizontal rod, radial members adjustable on the rod radially, rotationally and longitudinally thereof, coacting longitudinal bars on the members, and having a radial shoulder, resilient arms pivoted on the bars, raised portions adjacent the pivoted ends of the arms and disposed in angular relation relative thereto, said arms being curved circumferentially relative to the rod, bearing surfaces carried by the bars beneath and conforming to the curvature of the arms, other bars supported by certain of the members and disposed parallel to the first bars, said raised portions and certain of the bars having rounded ends, said other bars having portions engaging and supporting the bearing surfaces adjacent the free ends of the arms, and means for flexing the arms against said rounded ends.

9. A former of the class described, comprising bars supported for adjustment in an arc, radially and lengthwise, a plate extending laterally from the bars and curved on said arc, radius arms conforming to the plates and movable on the same, bending members extending over the plates adjacent the arms, and means on the plates for moving the arms to clamp a flat wire between the arms and bending members.

10. A former of the class described, comprising a bar, radial rods supporting the bar on a common axis, said bar having adjustable sections, said rods being adjustable with the sections, gauge blocks insertable between the sections when separated, and bending means extending outwardly from the bar and having arcuate members and members cooperating therewith for bending a flat wire thereagainst.

11. A former of the class described, comprising bars offset radially to form a shoulder and supported on a common axis for adjustment in three planes, said shoulder adapted to receive offset portions of flat wires thereagainst, stationary surfaces against which said wires are adapted to be angularly bent, arcuate plates extending from the bars laterally outwardly concentric to the axis, bending members over the plates, arms curved to fit the plates and pivoted at one end of each in alignment with a bar end for forming edgewise curved radius portions in the wires thereagainst, and spacing means for portions of the wires.

THOMAS MULLARKEY.